Sept. 25, 1956     M. W. SIMS ET AL     2,764,021
DEVICE FOR MEASUREMENT OF ARC ENERGY
Filed Nov. 12, 1952
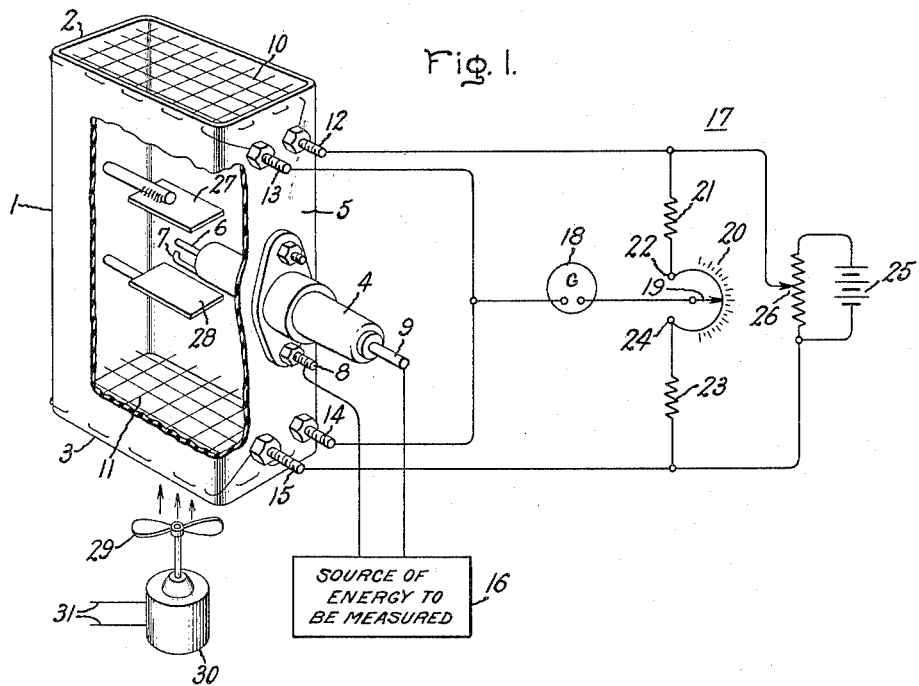
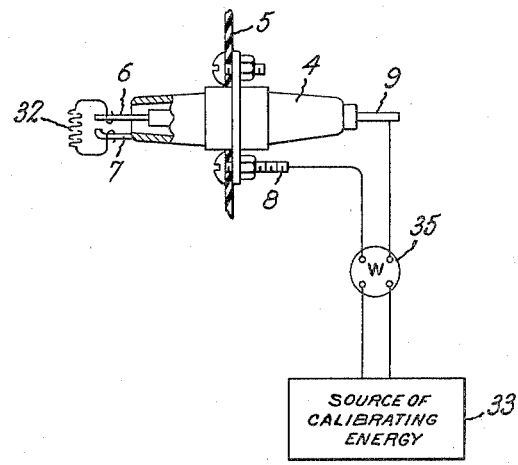
Inventors:
Marion W. Sims,
Aaron M. Krakower,
by
Their Attorney.

2,764,021
Patented Sept. 25, 1956

2,764,021
DEVICE FOR MEASUREMENT OF ARC ENERGY

Marion W. Sims and Aaron M. Krakower, Fort Wayne, Ind., assignors to General Electric Company, a corporation of New York Application November 12, 1952, Serial No. 320,047

1 Claim. (Cl. 73—190)

This invention relates to measurement devices and more particularly to devices for measuring arc energy.

In the evaluation of electric arc discharge systems, such as those used to ignite fuels in oil burning furnaces and jet engines, it is most important to be able to measure the electrical energy actually converted to heat within the arc itself. In the past, such measurements have been complicated and costly; one method consisting of utilizing a bomb calorimeter, which is complicated by the difficulties of handling the high voltages involved and the usual inaccuracies involved in the measurement of heat; and another method consisting of making oscillographs of the voltage and current of the arc discharge and making a laborious numerical integration to determine the energy. It is therefore desirable that a simple device be provided for making direct measurements of arc energy which is reliable and sufficiently accurate for most engineering development work. It is further desirable that such a device eliminates variations due to set-up and atmospheric conditions and that it be possible to constantly recalibrate the device to determine that it is not in error.

An object of this invention is therefore to provide an improved device for measuring arc energy incorporating the desirable features enumerated above.

Further objects and advantages will become apparent and the invention will be better understood by reference to the following description and the accompanying drawing, and the features of novelty which characterize this invention will be pointed out with particularity in the claim annexed to and forming a part of this specification.

In accordance with this invention, there is provided a tube, open at both ends. The arc discharge device of the system under test, for example, a spark plug, is mounted with its electrodes in the tube. This arc energy device is adapted to be connected to the source of energy of the system, for example a capacitor discharge circuit or an ignition transformer. Temperature sensitive elements, for example resistance elements, are mounted in the tube on either side of the electrodes, these elements thus sensing the average temperature of the air or other gas passing thereover. These resistance elements may take the form of grids of fine copper wire placed in the tube adjacent each end thereof. Means such as a resistance bridge is connected to the temperature sensitive elements to measure the temperature differential therebetween, thus measuring the heat energy added to the air stream by the arc established in the tube. Shields may be provided on either side of the electrodes to minimize radiation losses and a fan may be provided to force air upwardly through the tube at a constant rate. In order to calibrate the device, a resistance is connected across the electrodes of the arc discharge device and its terminals are connected to a source of energy with measuring means such as a wattmeter being connected to measure the input to the device. Current is then passed through the resistance and the value thereof adjusted to provide the same resistance bridge setting as that obtained with the arc being measured. The wattmeter measures the input to the resistor which is the same as the power output of the arc.

In the drawing, Fig. 1 is a view, partly broken away and partly schematic, illustrating the improved arc energy measuring device of this invention; and Fig. 2 is a fragmentary view showing the arrangement for calibrating the device of Fig. 1.

Referring now to Fig. 1, there is shown a vertically arranged tubular member 1, preferably formed of a thermally and electrically insulating material, and with its ends 2 and 3 open. A suitable arc discharge device, such as flange mounted spark plug 4, is mounted in wall 5 of tubular member 1 with its electrodes 6 and 7 in the tubular member 1 adjacent the middle thereof and its external terminals 8 and 9 arranged exteriorly thereof. Grids 10 and 11 of temperature sensitive fine wires, such as formvar coated copper magnet wire, are arranged in the tubular member 1 respectively adjacent the ends 2 and 3 thus forming electrical resistance elements responsive to temperature. Grid 10 is connected to external terminals 12 and 13 while grid 11 is connected to external terminals 14 and 15.

External terminals 8 and 9 of the spark plug 4 are connected to a suitable source of energy 16, such as an ignition transformer or a capacitor discharge system, for example the system shown in application Serial No. 299,416, filed July 15, 1952, of M. W. Sims, E. C. Hill and A. M. Krakower, now Patent No. 2,717,335, and assigned to the assignee of the present application. It will be readily apparent that when the tubular member 1 is mounted vertically in air, the heat liberated at the arc established between electrodes 6 and 7 of the spark plug 4 and the chimney effect of tubular member 1 will cause an upward flow of air by convection therethrough. Since the air leaving the tubular member 1 at the top end 2 is warmer than the air entering the bottom end 3, the upper grid 10 assumes a temperature higher than that of the lower grid 11 and, other things being equal, this temperature differential will be an indication of the energy being liberated at the arc. It will be further apparent that if this temperature condition is duplicated, by a known amount of heat introduced at the same location with other things remaining unchanged, the arc energy must be equal to the known energy input producing the same temperature conditions.

In order to determine the temperature differential between the grids 10 and 11, a simple resistance bridge circuit 17 is connected across terminals 12 and 13 of resistance grid 10 and terminals 14 and 15 of resistance grid 11. The circuit includes a suitable galvanometer 18 connected between terminal 13 of upper grid 10 and terminal 14 of lower grid 11 and sliding contact 19 of potentiometer 20. A fixed resistance 21 is connected between terminal 12 of upper grid 10 and one end terminal 22 of potentiometer 20 while a similar fixed resistance 23 is connected between terminal 15 of lower grid 11 and the other end terminal 24 of potentiometer 20. A suitable battery 25 provides the voltage applied to the circuit 17 with potentiometer 26 controlling the sensitivity of the circuit. With this arrangement, a null reading of the galvanometer 18 may be obtained by adjustment of the sliding contact 19 of potentiometer 20. With resistance grids 10 and 11 affected only by the heat generated in the arc between electrodes 6 and 7 of spark plug 4, the dial of potentiometer 20 may be calibrated in watts. Measurement of the power in the arc is then simply accomplished by adjusting potentiometer 20 for a null reading of galvanometer 18, the calibration of potentiometer 20 having been obtained against known power inputs as will be hereinafter described.

Radiation losses of the device are minimized by providing radiation shields 27 and 28 on either side of the electrodes 6 and 7 of spark plug 4, arranged so as to prevent direct radiation of heat from the arc to or beyond the grids 10 and 11. In the event that the power is high enough to raise the shield temperature to the point where re-radiation might be appreciable or when a high accuracy is required, a multiple shield completely surrounding the arc may be used to good advantage. Should the arc condition under study be one that takes place in an air stream, air is caused to flow at a predetermined constant rate or velocity through the tubular member 1 by means of a fan 29 driven by a suitable motor 30 energized from an external source (not shown) by lines 31.

In order to calibrate the device of Fig. 1, reference is made to Fig. 2 showing a small resistor 32 connected across electrodes 6 and 7 of spark plug 4. An adjustable source of calibrating energy 33 is connected across external terminals 8 and 9 of spark plug 4 through a suitable wattmeter 35. It is thus seen that any temperature condition in the tubular member 1 produced by the arc between electrodes 6 and 7 can be duplicated by the arrangement of Fig. 2 with the average power indicated by wattmeter 35 producing the same temperature conditions as did the arc discharge being investigated. It is thus seen that in order to calibrate the device, a reading is first taken with the circuit of Fig. 1 and after potentiometer 20 has been adjusted to produce a null reading on the galvanometer 18, the bridge 17 is left connected to grids 10 and 11, however the source of energy 16 is disconnected from spark plug 4 and the adjustable source of calibrating energy 33 and wattmeter 35 connected thereto as shown in Fig. 2 with resistance 32 also being connected across electrodes 6 and 7 and located physically near the position where the arc has occurred. Adjustable source of calibrating energy 33 is then adjusted until a null reading is obtained by galvanometer 18, potentiometer 20 being left of course with the same adjustment previously made. When the null reading of galvanometer 18 is obtained, it indicates that the same heat is being dissipated by resistor 32 as was dissipated by the arc between electrodes 6 and 7 during the previous measurement and thus the reading of wattmeter 35 indicates the heat energy of the arc in watts which can then be indicated on the dial of potentiometer 20. A series of similar measurements can be made to calibrate the dial of potentiometer 20, however it is preferable during each actual measurement as shown in Fig. 1 to re-calibrate the device with the arrangement of Fig. 2 in order to check the accuracy of the calibration. If it is necessary to measure the total energy per discharge in a series of spark discharges, the average power is measured and divided by the repetition rate; which if it is not known may be measured by one of various frequency meters or impulse counters commercially available.

It will be seen that possible errors may arise from losses such as conduction of heat through the electrodes, conduction through the tube wall, and radiation from the heat source, i. e. the arc. The accuracy of this improved system is however not greatly affected by such losses since all conditions including losses found in the unknown arc test occur also in the known heat run and tend to compensate for the corresponding losses in the test run. In addition, errors are further reduced by minimizing the losses in both cases, i. e. by arranging the device so that practically all of the arc energy and calibrating energy are converted to temperature rise within the tubular member 1. Conduction losses are minimized by insulating the tube 1 and electrodes 6 and 7 and it is further desirable to enclose the tubular member 1 in a suitable box for eliminating drafts.

It will now be seen that this invention provides an improved device for measuring arc energy characterized by its simplicity, accuracy, and direct reading.

While we have disclosed and described a specific embodiment of this invention, further modifications and improvements will occur to those skilled in the art and we therefore intend in the appended claim to cover all modifications which do not depart from the spirit and scope of this invention.

What we claim as new and desire to secure by Letters Patent of the United States is:

A device for measuring arc energy comprising a tubular member open at both ends, means for mounting a spark plug in the wall of said tubular member adjacent the center thereof with the electrodes of said plug disposed within said tubular member and their terminals exterior thereof and adapted to be connected to a source of energy to be measured, fan means arranged to blow air through said tubular member at a predetermined substantially constant rate, a grid of temperature sensitive wire in said tubular member adjacent each of said ends, shield members respectively arranged on each side of said electrodes, and a resistance bridge connected across said grids for measuring the difference in resistance thereof thereby measuring the temperature difference between said grids whereby the heat energy in the arc of said spark plug is measured.

References Cited in the file of this patent

UNITED STATES PATENTS

| | | |
|---|---|---|
| 1,257,568 | Wilson | Feb. 26, 1918 |
| 1,625,277 | Packard | Apr. 19, 1927 |
| 2,052,952 | Thomas | Sept. 1, 1936 |
| 2,110,837 | Coffey | Nov. 30, 1937 |
| 2,399,674 | Harrison | May 7, 1946 |
| 2,552,017 | Schwartz et al. | May 8, 1951 |